United States Patent [19]

Kashida et al.

[11] Patent Number: 4,803,570
[45] Date of Patent: Feb. 7, 1989

[54] ROTARY HEAD TYPE MULTICHANNEL INFORMATION SIGNAL REPRODUCING APPARATUS HAVING SUB-INFORMATION SEARCH FUNCTION

[75] Inventors: Motokazu Kashida, Tokyo; Toshiyuki Masui, Kanagawa; Tsutomu Fukatsu, Kanagawa; Koji Takahashi, Kanagawa; Masahiro Takei, Kanagawa; Kenichi Nagasawa, Kanagawa, all of Japan

[73] Assignee: Canon Kabushiki Kaisha, Tokyo, Japan

[21] Appl. No.: 891,253

[22] Filed: Jul. 28, 1986

[30] Foreign Application Priority Data

Aug. 6, 1985 [JP] Japan .................................. 60-172739
Aug. 7, 1985 [JP] Japan .................................. 60-173792

[51] Int. Cl.$^4$ ............................................. G11B 5/02
[52] U.S. Cl. .......................................... 360/61; 360/32
[58] Field of Search ....................... 360/73, 77, 32, 18, 360/19.1, 61

[56] References Cited

U.S. PATENT DOCUMENTS

4,139,954  2/1979  Yamamoto ............................ 360/18
4,453,186  6/1984  Watatani et al. ................... 360/19.1
4,558,378 12/1985  Shibata et al. ........................ 360/32

Primary Examiner—Vincent P. Canney
Assistant Examiner—Kevin Fournier
Attorney, Agent, or Firm—Robin, Blecker & Daley

[57] ABSTRACT

A reproducing apparatus for reproducing main information from a tape-shaped record bearing medium on which many recording tracks are formed in parallel and additional information recorded along with the main information in a predetermined position within each of a plurality of areas extending in parallel in the longitudinal direction of the medium is arranged to have one operation mode in which the main information and the additional information are reproduced from one of the plurality of areas and another operation mode in which the additional information is solely reproduced from two or more of the plurality of areas.

13 Claims, 9 Drawing Sheets

ROTARY HEAD TYPE MULTICHANNEL INFORMATION SIGNAL REPRODUCING APPARATUS HAVING SUB-INFORMATION SEARCH FUNCTION

BACKGROUND OF THE INVENTION

1. Field of the Invention

This invention relates to a data reproducing apparatus and more particularly to an apparatus of the kind reproducing main information data from a tape-shaped record bearing medium on which many recording tracks are formed with additional information data also recorded along with the main information data in a given position in the recording tracks.

2. Description of the Related Art

A typical example of apparatus of the above-stated kind, as disclosed in this specification, is an audio tape recorder which is arranged to record, using digital modification and time compression techniques, by means of a rotary head, an audio signal as a main information signal.

Figure 1:
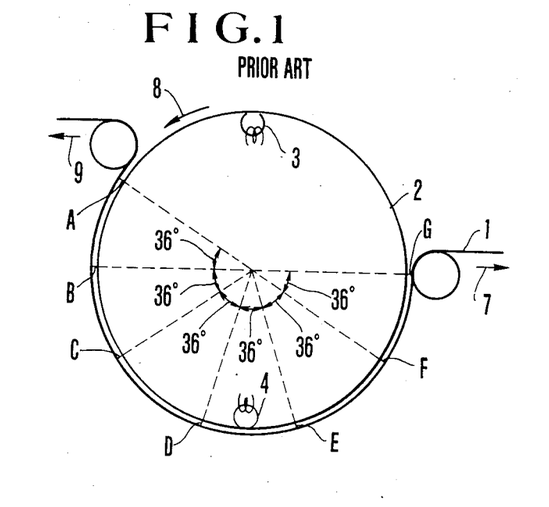
FIG. 1 is a schematic illustration of an example of the tape transport system of the conventional tape recorder.

FIG. 1 of the accompanying drawings shows by way of example the tape transport system of the conventional audio tape recorder of the above-stated kind. The illustration includes a magnetic tape 1; and a rotary cylinder 2 which carries rotary heads 3 and 4. The heads 3 and 4 are thus arranged to obliquely trace the tape 1 to record an audio signal on the tape. Six recording areas are arranged to extend in the longitudinal direction of the tape 1. Every time the heads 3 and 4 revolve 36 degrees, the audio signal is recorded in each of the six areas with time base compression. The tape recorder is thus arranged to be capable of recording audio signals in a total of six channels.

Figure 2:
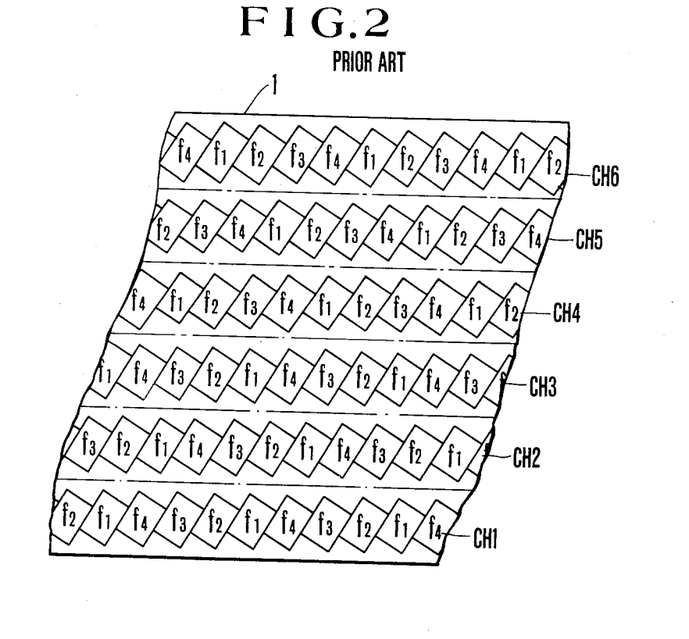
FIG. 2 is a schematic illustration of recording loci or tracks formed on a tape by the tape recorder of FIG. 1.

A brief description of this tape recorder is as follows: While the tape transport system is as shown in FIG. 1, FIG. 2 shows the recording loci of the tape recorder on the tape 1. Referring to FIG. 2, while the head 3 or 4 is tracing parts between points A and B, points B and C, points C and D, points D and E, points E and F and points F and G as shown in FIG. 1, the audio signal is recorded in the areas CH1 to CH6. It is possible to record the audio signal in each of these areas separately from another area. In each of these areas, recording is carried out in a manner called azimuth overlapped writing. The recording tracks within each of the areas CH1 to CH6 do not have to be perfectly aligned. Further, in each area, pilot signals are recorded for the purpose of tracking control. These pilot signals respectively have one of different frequencies f1 to f4. These different pilot signals are recorded in rotation in the following sequence of frequencies: f1→f2→f3→f4→within, each of these areas. However, the pilot signals in these areas have no correlation with each other.

A recording or reproducing operation is arranged to be performed in the areas CH1, CH2 and CH3 while the tape 1 is allowed to travel at a given speed in the direction of arrow 7 and to be performed in other areas CH4, CH5 and CH6 while the tape is allowed to travel in the direction of arrow 9 as shown in FIG. 1. As a result of this difference in the traveling direction of the tape, the inclination of recording tracks formed in the areas CH1 to CH3 somewhat differs from that of recording tracks formed in other areas CH4 to CH6 as shown in FIG. 2. However, a difference arising between these two groups of areas in the relative speed of the tape and the head due to the travelling speed of the tape 1 is very small and ignorable as compared with a difference due to the revolution of the heads 3 and 4.

Figure 3:
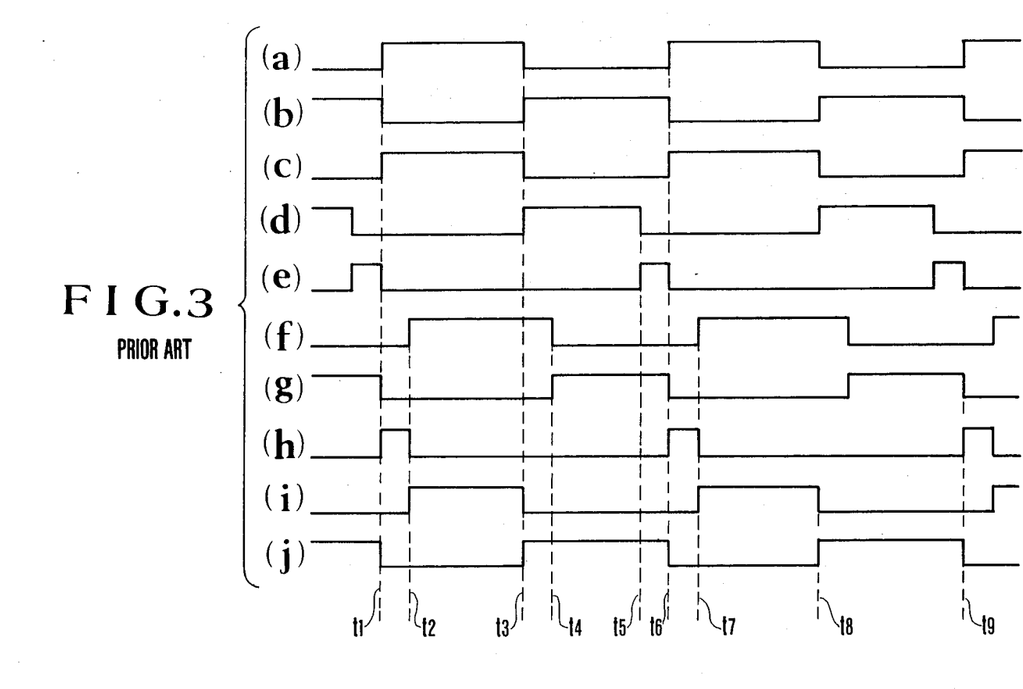
FIG. 3 is a time chart showing the recording and reproducing operations of the same tape recorder shown in FIG. 1.

FIG. 3 is a time chart showing the recording and reproducing operations of the conventional tape recorder which is arranged as described above. In FIG. 3, signal (a) represents a phase detection pulse signal generated in synchronism with the rotation of the cylinder (hereinafter referred to as PG signal (a)). The PG signal (a) is in a rectangular wave form which repeats a high level (hereinafter referred to as H level) and a low level (hereinafter referred to as L level) in a cycle of 1/60 sec. A signal (b) represents another PG signal which is of an opposite polarity to the PG signal (a). The PG signal (a) is at an H level during the revolution of the head 3 from the point B to the point G of FIG. 1. The PG signal (b) is also at an H level while the other head 4 is revolving between the points B and G.

A signal (c) of FIG. 3 represents a pulse signal obtained from the PG signal (a). Said pulse signal indicates a timing of sampling the audio signal of a period corresponding to one field portion (1/60 sec.) of a video signal for every other field. A signal (d) represents a pulse signal indicative of a timing for addition of a redundant code for correcting an error of the one-field portion of the audio data (or signal) sampled by using a RAM or the like for that purpose. The signal (d) is at an H level during this signal processing period. A signal (e) represents pulses the H level of which indicates a period of time for recording the above-stated signal processed data on the tape 1. The temporal flow of signals shown in FIG. 3 is as described below:

The data sampled during a period between points of time t1 and t3 (during the movement of the head 3 from the point B to the point G of FIG. 1) is subjected to a signal processing operation during a period between points of time t3 and t5 (while the head 3 is moving from the point G to the point A) and is recorded during a period between points of time t5 and t6 (while the head 3 is moving from the point A to the point B). In other words, the data is recorded in the area CH1 of FIG. 2 by the head 3. Meanwhile, the data sampled while the PG signal (b) is at an H level is subjected to a signal processing operation at a timing similar to the timing mentioned above and is then recorded in the area CH1 of the tape by the head 4.

A signal (f) of FIG. 3 represents another PG signal which is obtained by shifting the phase of the PG signal (a) to a given extent (to an extent of 36° which corresponds to one recording area in this instance). In recording an audio signal according to this PG signal (f) and a further PG signal which is of an opposite polarity to the PG signal (f), the conventional tape recorder operates as follows: Audio signal data which is sampled during a period between points of time t2 and t4 of FIG. 3 undergoes a signal processing operation carried out during a period between time points t4 and t6 according to a signal (g) shown in FIG. 3. The data is then recorded during a period between time points t6 and t7 according to a signal (h) of FIG. 3. More specifically, the data is recorded in the area CH2 of FIG. 2 while the head 3 is tracing the tape 1 from the point B to the point C of FIG. 1. Data which is sampled during another period between time points t4 and t7 is likewise recorded in the area CH2 by means of the head 4.

The signal or data which is thus recorded in the area CH2 is reproduced in the following manner: The data is read out from the tape 1 by means of the head 3 in accordance with the signal (h) of FIG. 3 during a period between points of time t6 and t7 (or between t1 and t2). The data thus read out is then subjected during a period between time points t7 and t8 (or t2 and t3) to a signal processing operation which is carried out according to a signal (i) shown in FIG. 3 in a manner reverse to the signal processing operation performed for recording. In other words, error correction, etc. are accomplished during this period. After completion of signal processing, a reproduced audio signal is produced according to a signal (j) shown in FIG. 3 during a period between points of time t8 and t9 (or t3 and t6). The reproducing operation with the head 4 is of course performed in exactly the same manner as the abovestated operation except that it is performed at a phase difference of 180 degrees. With the two heads used for reproduction in this manner, a reproduced audio signal is obtained in a continuous manner.

It goes without saying that, for each of other areas CH3 to CH6, the phase of the PG signal (a) is shifted to a degree of n×36° as applicable and recording and reproducing operations are carried out in the same manner as described in the foregoing. These operations are independent of the travelling direction of the tape.

Figure 4:
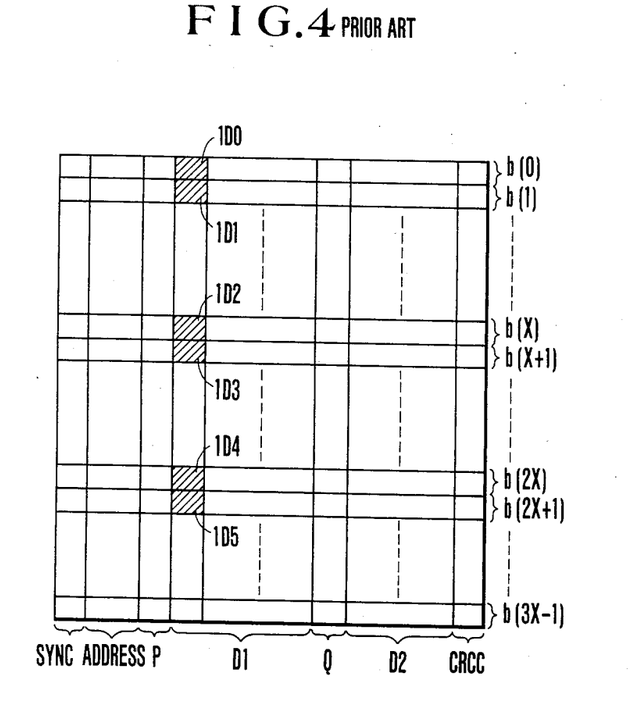
FIG. 4 is an illustration of a data format in which data is to be recorded in each of recording tracks within each of recording areas shown in FIG. 2.

FIG. 4 shows a data matrix showing a format in which data is recorded in one track in each of the recording areas shown in FIG. 2. More specifically, this is an example of the data format including PCM audio data corresponding to the audio signal of two channels operating in a cycle of 1/60 sec. In the data matrix of FIG. 4, a column SYNC indicates a synchronizing data column; a column ADDRESS indicates an address data column; columns P and Q indicate error correcting redundant data columns respectively; a column CRCC indicates a known cyclic redundancy check code column; and columns D1 and D2 indicate data columns including audio signal information of the two channels respectively. Meanwhile, reference symbols b(0) to b(3x-1) denote lines of the data matrix respectively. Each of these lines forms a data block, in which data is recorded from the left-hand side to the right-hand side end of the line as viewed on the drawing one after another. For example, the data of the column ADDRESS in the line b(0) is recorded after the data of the column SYNC in the line b(0). Then, the data of the next column P in the same line b(0) is recorded after the data of the column ADDRESS and so on. After the data of the last column in the line b(l) is recorded the data of the column SYNC in the line b(l+1) is recorded. Data recording for one recording track comes to an end upon completion of recording the data of the last column in the last line b(3x-1).

Among the columns included in the group of columns D1, six data ID0 to ID5 on the lines b(0), b(1), b(x), b(x+1), b(2x) and b(2x+1) in the first column D1 are data carrying some additional information other than audio signal information. For example, the following additional information may be recorded in the positions of data ID0 to ID5: A mode information mark indicative of the travelling direction of the tape taken in recording or indicative of a track pitch which will be described later herein; a number assigned to an area to be used next time for recording; a length of time from the leader part of each program of the main information or from the end of the tape; and a program number or the like.

The apparatus of the kind mentioned in the foregoing is arranged to have two different recording/reproducing operation modes. One is a long play mode (hereinafter referred to as LP mode) in which the recording tracks are arranged to be formed at a narrower pitch than a standard track pitch for the purpose of performing recording and reproduction over a longer period of time than a standard operation. The other is a standard play mode (hereinafter referred to as SP mode) in which the recording tracks are formed at the standard track pitch for standard recording and reproduction. It is desirable to have some information on these modes recorded along with the audio data. In that instance, it is preferable to have two different recording and reproducing heads arranged, one for the SP mode and the other for the LP mode. Then, the data ID0 to ID5 of FIG. 4 may be used in recording mode information indicating the SP and LP modes.

In performing a recording operation with the tape recorder which is arranged as described above, the operator of the recorder selects (or designates) one of the areas in which recording is to be made. The additional information mentioned above then may be used for making this selection. In that instance, it is important for effective recording to first review before selecting a specific area all the information by reproducing the additional information about all the areas CH1 to CH6. For example, the travelling direction or speed of the tape is adjusted to a part already recorded or a part having a shorter length of time from the leader part among all the programs may be designated as an area to be used for recording. However, since there is no correlativity among the recording areas as mentioned in the foregoing, tracking control must be performed over all the areas one after another if all the additional information recorded along with the main information is to be reproduced. In that event, the recording operation not only requires an excessively long period of time but also necessitates an extremely complex logic arrangement for system control.

Further, it is impossible to quickly detect the additional information about all the areas for the whole length of the tape. It has been also impossible to look up desired additional information about all the areas, such as making a search for a part having a zero length of time from the leader part of a program.

In addition to these problems, there arises the following problem with regard to mode information on the SP and LP modes in cases where a part which has been recorded in the SP mode and another part having been recorded in the LP mode coexist in one and the same recording area: For recording by the so-called azimuth overlapped writing is reproduced using tracking control with tracking control pilot signals, the head must have the width thereof arranged to be wider than the track pitch. Let us assume that, during a reproducing operation on some area, the recording mode comes to change from the LP mode over to the SP mode and vice versa. In the event of the change to the SP mode while reproduction is being performed with the head for the LP mode, a record pattern formed in the SP mode is traced by the head for the LP mode. In this case, since the width of the LP mode head is generally arranged to be narrower than the pitch of tracks formed in the SP mode, the above-stated ID signal (or data) can be reproduced with a tracing action performed several times. Therefore, there arises no problem as it can be thus detected that the recording operation has been performed in the SP mode.

Whereas, in case that the record mode shifts to the LP mode during the process of reproduction in the SP mode, the record pattern formed in the LP mode comes to be traced by the head for the SP mode. Assuming that the travelling speed of the tape of the LP mode and that of the SP mode are in the ratio of 1:2 and that the head width of the SP mode head is 3/2 times as much as the pitch of the tracks formed in the SP mode, the head width of the SP mode head is three times as much as that of the LP mode head. Therefore, even in the case of azimuth recording, the head comes to produce reproduced signals simultaneously from two or more tracks. As a result, it becomes difficult to correctly reproduce the ID signals and to accurately detect that the information has been recorded in the LP mode.

SUMMARY OF THE INVENTION

A general object of this invention is to provide a data reproducing apparatus which is capable of solving the problems of the prior art mentioned in the foregoing.

It is a more specific object of this invention to provide a data reproducing apparatus which is capable of promptly reproducing additional information data from a plurality of recording areas extending in parallel in the longitudinal direction of a tape-shaped record bearing medium.

Under this object, an apparatus arranged according to this invention as an embodiment thereof to reproduce main information and additional information from a tape-shaped record bearing medium which has a plurality of longitudinally and parallel extending areas, each area having many recording tracks formed with the main and additional information recorded there, comprises: a rotary head arranged to transversely trace the plurality of areas provided on the tape-shaped record bearing medium; first reproducing means for reproducing the main information by using the output signal of the rotary head; second reproducing means for reproducing the additional information by using the output signal of the rotary head; and manually operable means for change-over between a plurality of operation modes of the apparatus, including a first mode in which: the first reproducing means reproduces the main information recorded in one of the plurality of areas while the second reproducing means reproduces the additional information recorded in the same area from which the main information is being reproduced by the first reproducing means; and a second mode in which: the second reproducing means reproduces the additional information from at least two of the plurality of areas while the first reproducing means does not reproduce the main information.

It is another object of this invention to provide a data reproducing apparatus whereby data indicative of a track pitch at which recording tracks are formed on a tape-shaped record bearing medium can be reliably reproduced from the medium on which the track pitch data is recorded along with data indicative of main information.

Under that object, an apparatus arranged according to this invention as another embodiment thereof to reproduce from a tape-shaped record bearing medium main information and additional information relative to a pitch at which many recording tracks are formed on the medium with the main information and the additional information recorded thereon comprises: a first rotary head having a head width corresponding to a first track pitch; a second rotary head having a head width corresponding to a second track pitch which is narrower than the first track pitch; first reproducing means for reproducing the main information; second reproducing means for reproducing the additional information; and mode change-over means for change-over between a plurality of operation modes of the apparatus including, a first mode in which: the first reproducing means reproduces the main information by using the output signal of the first rotary head and the second reproducing means reproduces the additional information by using the output signal of the second rotary head; and a second mode in which: the first reproducing means reproduces the main information by using the output signal of the second rotary head.

These and further objects and features of this invention will become apparent from the following detailed description of preferred embodiments thereof taken in conjunction with the accompanying drawings.

DETAILED DESCRIPTION OF THE PREFERRED EMBODIMENTS

Figure 5:
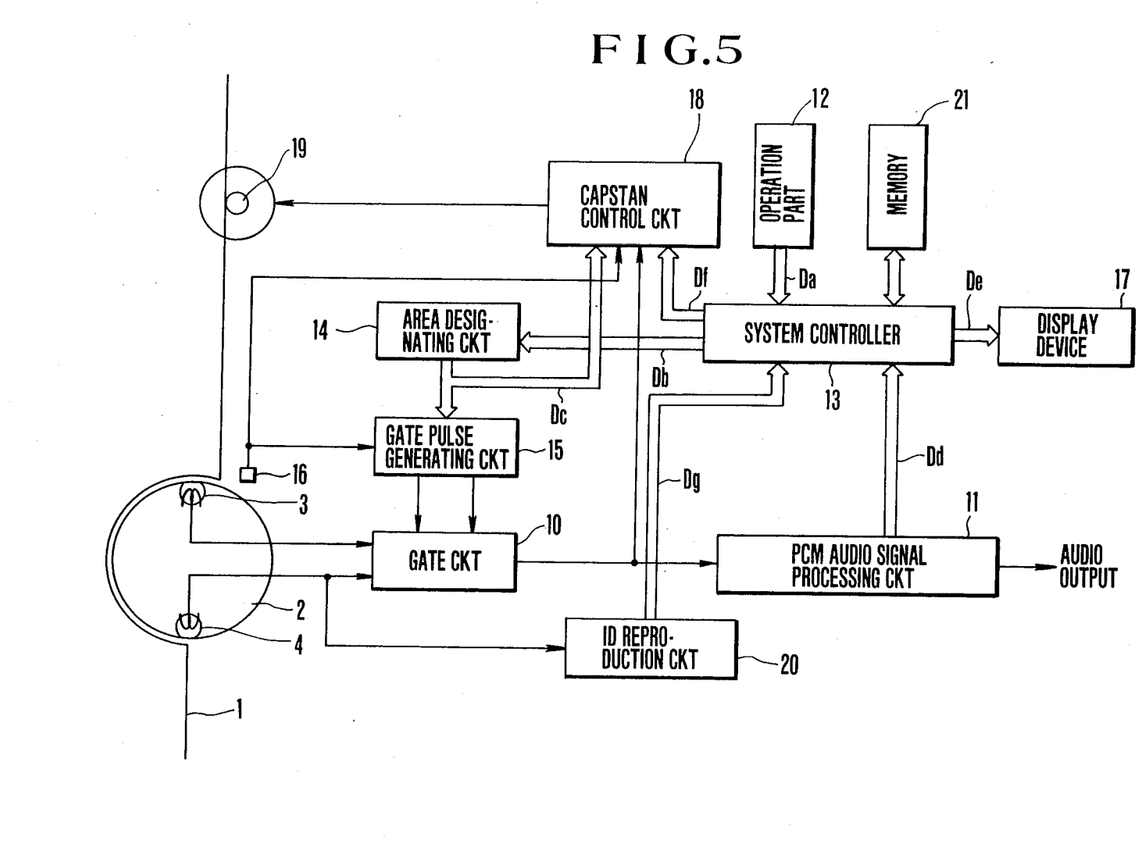
FIG. 5 is a diagram showing in outline the arrangement of a reproducing apparatus arranged according to this invention as an embodiment thereof.

FIG. 5 shows in outline the arrangement of a tape recorder which is of the kind mentioned in the foregoing and to which this invention is applied as an embodiment thereof.

During normal reproduction, the output signals of heads 3 and 4 which have different azimuth angles from each other are supplied to a gate circuit 10. The gate circuit 10 is arranged to supply only the signal that is reproduced from a designated area to a PCM audio signal processing circuit 11. The PCM audio signal processing circuit 11 performs a signal processing operation on the reproduced signal including time base expansion, error correction, etc. in a known manner and produces an audio signal.

Meanwhile, gate pulses are formed in the following manner: An operation part 12 is arranged to be manually operated for producing data Da which is a reproducing mode designating data including: data designating a reproducing area; data indicating whether a search is to be made for a leader part or the like or reproduction is to be made in a normal manner; and data designating reproduction of ID signals provided in all the areas. Data Da for an instruction to bring the apparatus to a stop also can be produced from the operation part 12. The data Da from the operation part 12 are supplied to a system controller 13. Upon receipt of these data Da, the system controller 13 supplies an area designating circuit 14 with data Db which is necessary for designation of one of the areas provided on the tape 1. Upon receipt of the data Db, the area designating circuit 14 supplies an area designating data Dc to a gate pulse generating circuit 15. A rotation detector 16 is arranged to detect the rotation of a rotary cylinder 2. The detector 16 produces a PG signal which is supplied also to the gate pulse generating circuit 15. The gate pulse generating circuit 15 uses the PG signal together with the area designating data Dc and produces gate pulses for the outputs of the heads 3 and 4. Under a normal reproducing condition, ID signals are also reproduced at the PCM audio signal processing circuit 11. With the ID signal thus reproduced, additional information data Dd is produced from the circuit 11 and is supplied to the system controller 13. Upon receipt of this data Dd, the controller 13 supplies display data De to a display device 17 as necessary. A capstan control circuit 18 is arranged to be supplied with a tracking error signal which is obtained in accordance with the known four-frequency method. Upon receipt of the tracking error signal, the circuit 18 controls the rotation phase of a capstan 19 accordingly.

In an operation mode in which the ID signals of all the areas CH1 to CH6 are to be reproduced, the embodiment operates as follows: When an instruction for the all area ID signal reproducing mode is produced from the operation part 12, no specific area is designated by the area designating circuit 14. The gate pulses cease to be produced from the gate pulse generating circuit 15. As a result, the supply of the reproduced signal to the PCM audio signal processing circuit comes to a stop. Meanwhile, an ID reproduction circuit 20 receives the reproduction output of the head 4 directly from the head 4 without having it via the gate circuit 10. Then, with the capstan control circuit 18 operating in a manner as will be described later, the ID signals of all the areas can be reproduced while the head 4 is performing its tracing action several times. The ID reproduction circuit 20 then supplies additional information data Dg to the system controller 13. The data Dg is then stored at a memory 21 until all the ID signals are completely reproduced. The data Dg which is thus stored at the memory 21 is arranged to be reflected if necessary on the display data De.

In the case of reproducing the ID signals of all the areas, the travelling speed of the tape is as follows: The tape speed in this instance must meet the following two conditions: The tape must be allowed to travel at such a speed to enable the data ID0 to ID5 which are recorded in different positions even within the same area to be simultaneously reproduced. Next, the ID signals (or data) of all the areas must be detected within a minimum possible length of time.

Figure 6:
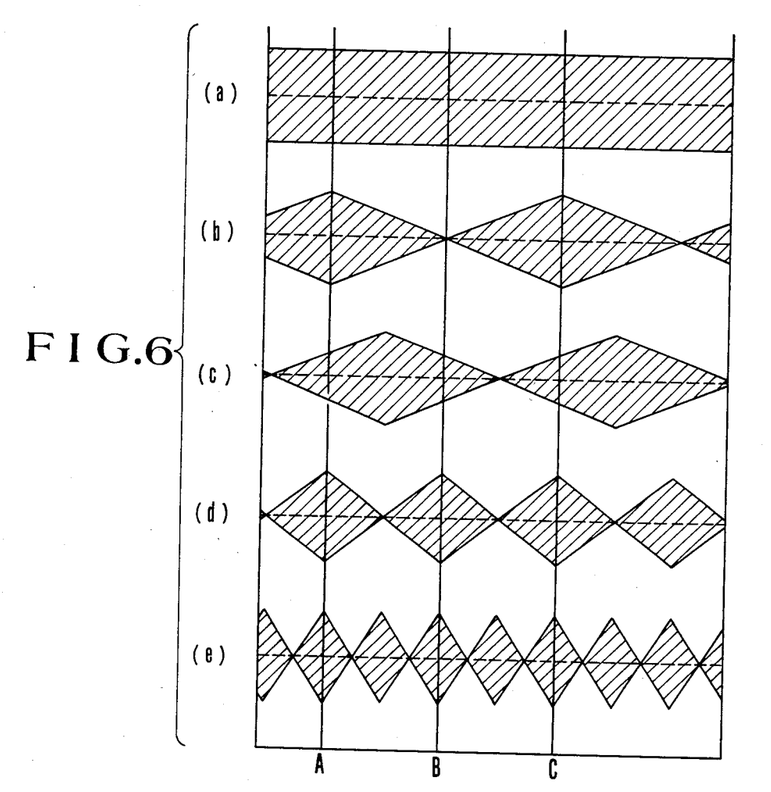
FIG. 6 is an illustration of reproduction outputs in relation to the travelling speeds of the tape.

FIG. 6 shows the reproduction output in relation to the travelling speed of the tape. In each of envelope wave forms shown, a left end part shows a timing for entrance into an area and a right end part a timing of completion of a tracing action on a designated area. In other words, the envelope wave form obtains while the heads 3 and 4 revolve 36° (1/300 sec.). Again referring to FIG. 4, the data matrix shown represents recording made while the rotary heads 3 and 4 revolve 31° from a point of time obtained with these heads having revolved 5° after their entrance into the designated area. In this instance, assuming that the data of the column SYNC consists of three bits, that of the column CRCC consists of 16 bits and each of all other data consists of eight bits, the data ID0 and ID1 are recorded while the heads 3 and 4 revolve (36×0.14) degrees after their entrance into the designated area; the data ID2 and ID3 are recorded while they revolve (36×0.39) degrees; and the data ID4 and ID5 are recorded while they revolve (36×0.64) degrees. The positions in which these ID data are recorded are as indicated by reference symbols A, B and C in FIG. 6.

In FIG. 6, (a) to (e) represent examples of setting the travelling speed of the tape and the phase at which entrance is made into each recording track. Assuming that the tape speed employed in recording is V, the envelope wave forms of the reproduced signals are as follows: A just track state is obtained, with the tape travelling at the speed V, at a point A in the case of the example (a); with the tape travelling at a speed 21V, a just track state obtains at the point A in the example (b); with the tape travelling at a speed 21V, a just track state obtains at a point between points A and B in the example (c); with the tape speed set at 41V, a just track state obtains at the point A in the case of the example (d); and, with the tape speed set at 81V, a just track state obtains at the point A. As apparent from FIG. 6, in case that all the data ID0 to ID5 of one area are to be detected through one performance of the tracing action, the ID data reproduced signal is obtainable from the whole track width if the tape speed is set at a value $(40n+1)V$, wherein "n" represents an integer. However, for such reproduction, the width of the head used for the reproduction must be equal to the width of the track. Generally, the head width is arranged to be wider than the track width to give some allowance for precision requirement. Further, in cases where the ID signal (or data) is arranged to be reproducible from 50% of the total track width, the tape speed may be set at $(20n+1)V$ as will be understood from (c) of FIG. 6. Further, in case where it is only the data ID0, ID1, ID4 and ID5 that are to be reproduced, the tape speed also may be set at $(20n+1)V$ as will be understood from (b) of FIG. 6.

Further consideration of arrangement to read out the data ID0 to ID5 of one area by a single performance of tracing is as follows: Under a condition in which the data ID0 to ID5 can be detected by a single performance of the tracing action of the head, the ID signals of all the areas can be reproduced with the tracing position of the head shifted forward or backward to an extent of a two track-pitch distance at a time without changing the travelling speed of the tape.

Figure 7:
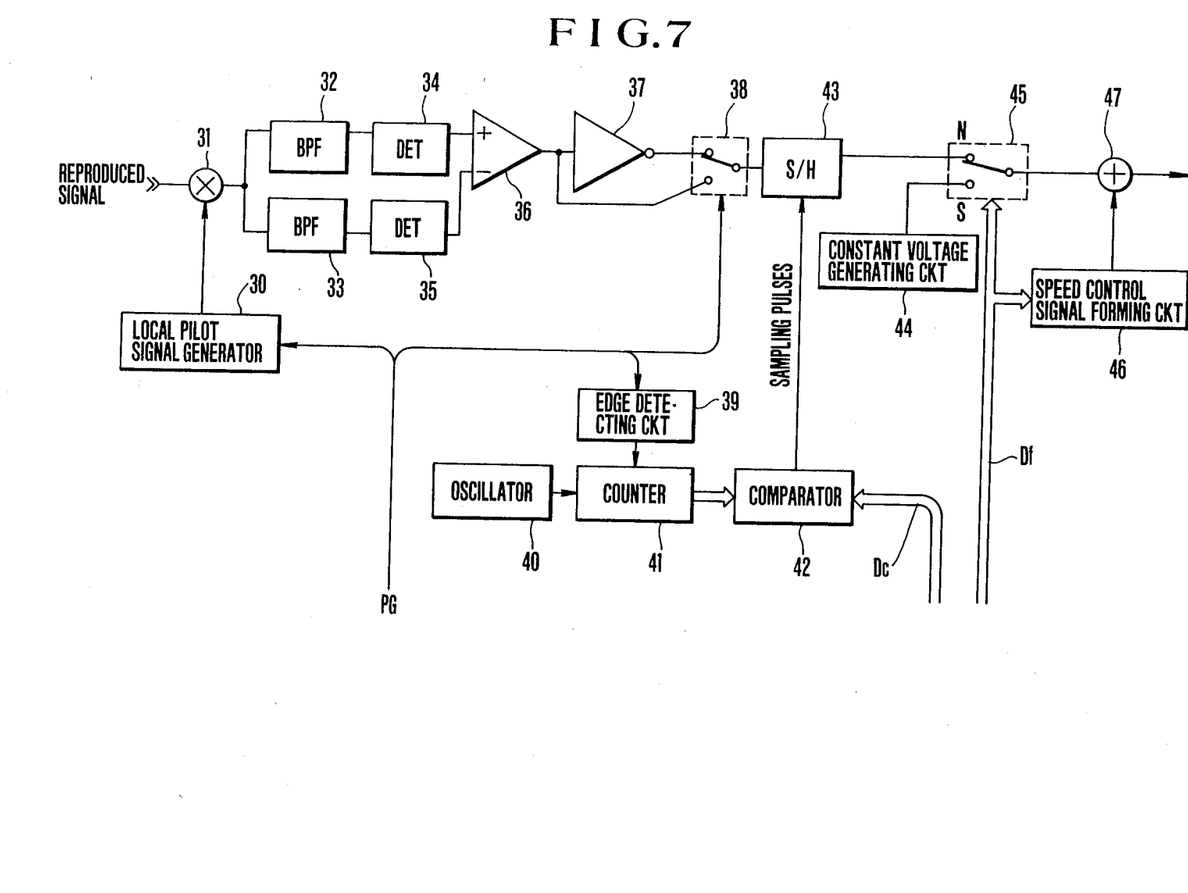
FIG. 7 is a diagram showing by way of example the details of a capstan control circuit included in the embodiment shown in FIG. 5.
Figure 8:
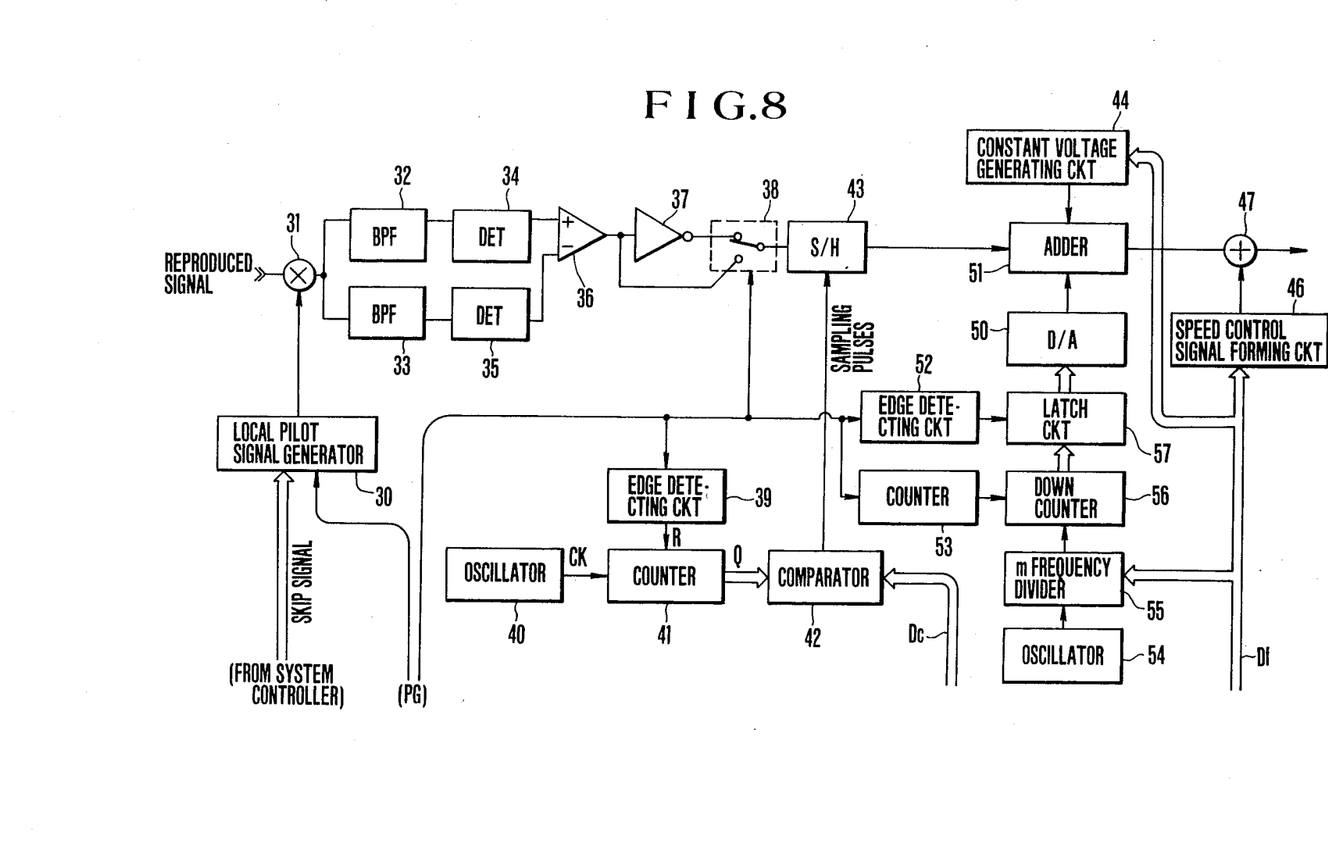
FIG. 8 is a diagram showing another example of an arrangement of the capstan control circuit of the embodiment of FIG. 5.

Therefore, with the tape speed set at $(40n+1\pm1/m)V$, wherein "m" represents an integer which is 2 or more, the ID signals of all the areas can be detected by allowing the head to perform the tracing action 2m times. FIGS. 7 and 8 show examples of arrangement of the capstan control circuit 18 required for detecting the ID signals from all the areas in the manner as mentioned above.

In the arrangement of the capstan control circuit 18 shown in FIG. 7, a multiplier 31 is arranged to receive the reproduced signals. The multiplier 31 performs a multiplying operation, in a well known manner, on a reproduced pilot signal and a reference signal (local pilot signal) which is of the same frequency as that of a pilot signal superimposed on a main information signal recorded in the track presently under tracking control. A local pilot signal generator 30 is arranged to generate such local signals in synchronism with the PG signal. Band-pass filters (BPF's) 32 and 33 and detection circuits (DEF) 34 and 35 are arranged to detect the levels of pilot signals reproduced from tracks adjoining the track under control on both sides thereof. The outputs of the DET circuits 34 and 35 are compared with each other at a differential amplifier 36. An inverting amplifier 37 is arranged to invert the output of the differential amplifier 36 at every tracing action of the head. The inverted output is then produced from a switch 38. In this instance, any pilot signals other than the pilot signals reproduced from a designated area are invalid. Therefore, the output of the switch 8 is sampled and held by a sample-and-hold circuit (S/H circuit) 43 at a timing at which the head traces the designated area. A counter 41 is arranged to count a number of pulses produced from an oscillator 40 with the counting action performed at a timing defined by the edges of the PG signal detected by an edge detecting circuit 39. A counted value thus obtained is compared at a comparator 42 with area designating data Dc which is determined according to the area designated. Upon detection of coincidence between the data Dc and the counted value of the counter 41, the comparator 42 produces a pulse-like output. This output is supplied as sampling pulses to the S/H circuit 43. Under a normal reproducing condition, the output of the S/H circuit 43 is produced via one side N of a switch 45 and is used as a tracking control signal for controlling the rotation phase of the capstan 19. This signal is added to a speed control signal at an adder 47.

In the case of reproducing the ID signals of all the areas as mentioned above, the speed control signal is formed at a speed control signal forming circuit 46 according to the tape speed $(40n+1)V$. To this signal is added as a phase control signal the output of a constant voltage generating circuit 44. Assuming that the constant voltage signal which is produced from the circuit 44 for phase shifting is, for example, at a level corresponding to the tape speed $(1/m)V$, the ID signals of all the areas can be reproduced by allowing the head to perform the tracing action 2m times.

In FIG. 8, the same components as those of FIG. 7 are indicated with the same reference numerals. Under a normal reproducing condition, the circuit arrangement of the capstan control circuit operates similarly to the circuit arrangement of FIG. 7 because the data Df causes the constant voltage generating circuit 44 to produce its output at a zero value and, therefore, the output of a digital-to-analog converter (D/A) 50 is also at a zero value as will be described later herein.

An oscillator 54 is arranged to generate a predetermined number of pulses which becomes a tracking error signal which is caused to deviate by one track due to the digital-to-analog conversion performed by the D/A converter 50 within one period of the PG signal. In cases where the output of the constant voltage generating circuit 44 is arranged to correspond to the tape speed $(1/m)V$, the output of the oscillator 54 is frequency divided by an "m" frequency divider 55. The output of the "m" frequency divider 55 is counted by down counter 56. The counter 56 is arranged to continuously obtain counted values corresponding to tracking error signals representing tracking deviation values between +1 and −1 while the head traces the track 2m times. A counter 53 is arranged to produce its output every time it has counted an "m" number of pulses of the PG signal. The output of the counter 53 resets the down counter 56. The output of the down counter 56 is latched at a latch circuit 57 according to the output of an edge detecting circuit 52 which is produced every time an edge of the PG signal is detected. The output of the latch circuit 57 is digital-to-analog converted by a D/A converter 50 and is then supplied to an adder 51. The output of the D/A converter 50 becomes an error signal showing a tracking error decreasing by a degree corresponding to 1/m track every time an edge of the PG signal is detected while the head is tracing the track 2m times. The output of the S/H circuit on the other hand becomes a tracking error signal which increases by the degree corresponding to 1/m track at every sampling. In this case, therefore, the phase of the capstan can be controlled with the tape speed set at $(4n+1+1/m)V$.

In a modification of the capstan control circuit arrangement shown in FIGS. 7 and 8, tracking control for reproduction of the ID signals of all the areas can be also accomplished by setting the tape speed at $(4n+1+1/m)V$ and by arranging the S/H circuit 43 to perform the sampling action once while the head is tracing 2m times.

In the tape recorder of the embodiment described, the ID signals of all the areas can be quickly detected and displayed by setting the tape travel speed at a value $(4n+1+1/m)$ times as high as the tape speed employed in recording and by setting the tape recorder in a mode in which it reproduces only the ID signals. The embodiment is, therefore, highly advantageous in designating a specific recording or reproducing area of the tape.

Figure 9:
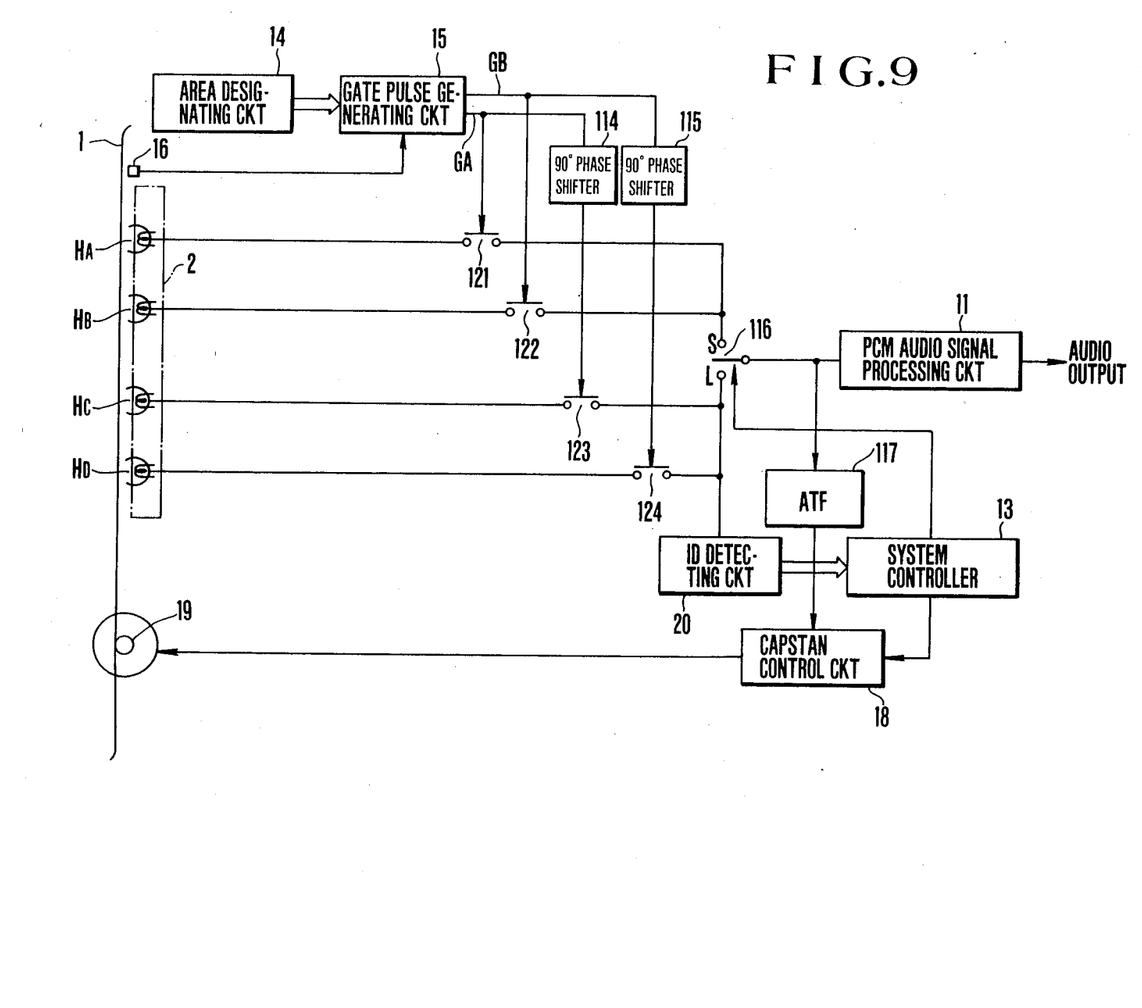
FIG. 9 is a diagram showing in outline the arrangement of the reproducing system of a tape recorder embodying this invention as another embodiment thereof.
Figure 10A:
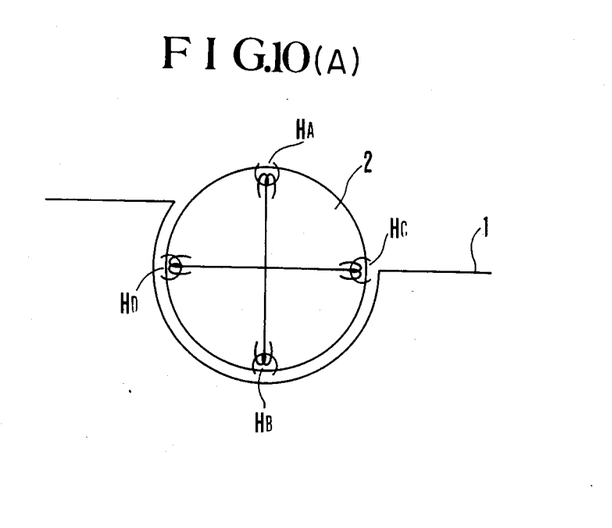
FIGS. 10(A) and 10(B) are illustrations of allocation of the heads of the embodiment shown in FIG. 9.
Figure 10B:
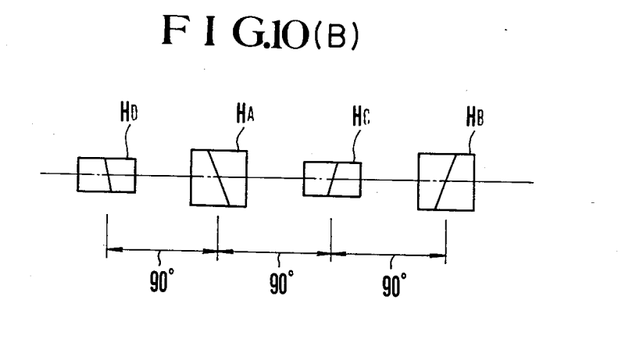

FIG. 9 shows in outline the arrangement of the reproducing system of a tape recorder as another embodiment of this invention, which is arranged to ensure accurate reproduction of mode information data. FIGS. 10(A) and 10(B) show the arrangement of heads of the same tape recorder.

Referring to FIGS. 10(A) and 10(B), heads HA and HB are provided for the SP mode and are mounted on a rotary cylinder 2 at a phase difference of 180° between them. Heads HC and HD are for the LP mode and are likewise mounted on the rotary cylinder 2 at a phase difference of 180° between them. The heads HA and HB for the SP mode are arranged to revolve at a phase difference of 90° from the heads HC and HD for the LP mode respectively.

Referring to FIG. 9, an area from which recorded signals are to be reproduced is designated at an area designating circuit 14. This information is supplied to a gate pulse generating circuit 15. A rotation detector 16 is arranged to detect the rotation of the rotary cylinder 2. The gate pulse generating circuit 15 generates gate pulses on the basis of the detection output of the detector 16. In other words, the circuit 15 produces gate pulse signals GA and GB which are synchronized with timings at which the heads HA and HB trace the area designated by the designating circuit 14. The gate pulse signals GA and GB respectively control switches 121 and 122 to cause them to gate the reproduction outputs of the heads HA and HB.

Other heads HC and HD are arranged to differ 90° in rotation phase from the heads HA and HB respectively as mentioned above. Therefore, switches 123 and 124 which are arranged to gate the reproduction outputs of the heads HC and HD operate under the control of pulse signals obtained by means of 90° phase shifters 114 and 115, respectively, which phase shift by 90° the gate pulse signals GA and GB.

A switch 116 is arranged to have its connecting position on one side S thereof for reproduction in the SP mode and on the other side L for reproduction in the LP mode. In each of these different modes, the switch 116 supplies the reproduced signal produced from the applicable heads to a PCM audio signal processing circuit 11. Upon receipt of the signal, the PCM audio signal processing circuit 11 operates and produces a reproduced audio signal output.

An ID detecting circuit 20 is arranged to detect the ID signals which include track pitch information as mentioned in the foregoing. The circuit 20 receives the signals reproduced by the LP mode heads HC and HD in either case of reproduction in the SP mode or in the LP mode, so that the additional information can be reproduced in both cases. The reproduced additional information is supplied to a system controller 13. Then, applicable parts of the apparatus are controlled on the basis of the additional information. The connecting position of the switch 116 is changed from one position to the other on the basis of the track pitch data included in the output of the ID detecting circuit 20.

A capstan control circuit 18 is arranged to control the rotating speed of a capstan 19 on the basis of the track pitch data mentioned above. The rotation phase of the capstan 19 is controlled with a tracking control signal which is obtained from an ATF circuit 117 by the known four frequency control method. In this case, the ATF circuit 117 is arranged to receive the output of the switch 116 and to obtain a tracking error signal by using pilot signals included in the signals obtained from each of the recording areas of the tape. The, the tracking control signal is obtained by sampling the tracking error signal at every tracing action of the head.

With the embodiment arranged in the manner described, the LP mode heads are used for detecting the ID signal even during a reproducing operation performed in the SP mode. Therefore even in the event of a change from the track pitch for the SP mode to the track pitch for the LP mode during the process of reproduction, the embodiment is capable of promptly and reliably detecting the additional information included in the ID signals. Therefore, the arrangement according to the present invention enables the operator to safely and accurately switch the SP mode over to the LP mode while the apparatus is in the process of reproduction.

What is claimed is:

1. An apparatus for reproducing main information and additional information from a tape-shaped record bearing medium which has a plurality of areas extending longitudinally and in parallel with each other, each area having many helical slant tracks on each of which the main and additional information are recorded, said main information in one of said many helical tracks being larger in quantity than said additional information, comprising:
    (a) a rotary head arranged to transversely trace the plurality of areas provided on said tape-shaped record bearing medium;
    (b) area designating means for designating one of said plurality of areas;
    (c) gate means arranged to gate a signal reproduced by said rotary head in response to said area designating means for outputting informations recorded on said one of said plurality of areas;
    (d) first process means for processing said main information gated by said gate means;
    (e) second process means for processing said additional information reproduced by said rotary head; and
    (f) manually operable means for changing over a plurality of operation modes of the apparatus, the plurality of modes including
        a first mode in which: said first process means outputs said main information recorded in the area designated by said area designating means, and said second process means only outputs said additional information recorded in the same area from which said main information is being outputted by said first process means; and
        a second mode in which: said second process means simultaneously outputs said additional information from at least two of said plurality of areas.

2. An apparatus according to claim 1, wherein, in said first mode, said gate means operates to allow the signal reproduced by said rotary head to be supplied to said first process means only when said rotary head is tracing said area designated by said area designating means.

3. An apparatus according to claim 2, wherein said gate means is arranged not to allow the signal reproduced by said rotary head to be supplied to said first process means in said second mode.

4. An apparatus according to claim 1, wherein the signal reproduced by said rotary head is arranged to be supplied to said second process means without passing through said gate means.

5. An apparatus according to claim 1, further comprising moving means for longitudinally moving said tape-shaped record bearing medium, said moving means being arranged to cause said medium to travel at a first speed V in said first mode and at a second speed being different from said first speed in said second mode.

6. An apparatus according to claim 1, further comprising display means for displaying said additional information which is outputted by said second reproducing means.

7. An apparatus according to claim 1, wherein said main information is audio information; and said audio information is recorded in said recording tracks in the form of digital data.

8. An apparatus according to claim 7, wherein said additional information is mixed in said audio information data in the form of digital data.

9. An apparatus according to claim 8, wherein said additional information includes information on the track pitch of said recording tracks.

10. An apparatus for reproducing main information and additional information from a tape-shaped record bearing medium which has a plurality of areas extending longitudinally and in parallel with each other, each area having may helical slant tracks on each of which said main and additional information are recorded, comprising:
    (a) moving means for moving said tape-shaped record bearing medium in a longitudinal direction thereof;
    (b) a rotary head arranged to transversely trace said plurality of areas provided on said tape-shaped record bearing medium;

(c) first process means for processing said main information reproduced from one of said plurality of areas reproduced by said rotary head;
(d) second process means arranged to be able to simultaneously process information reproduced from at least two of said plurality of areas by said rotary head;
(e) generating means for generating a tracking error signal which indicates a tracking error of said rotary head to the tracks of one of said plurality of areas;
(f) control means for controlling the medium moving action of said moving means; and
(g) manually operable means for changing over a plurality of operation modes of said apparatus, the plurality of modes including a first mode in which said first process means outputs said main information recorded in one of said plurality of areas, said moving means moves said tape-shaped record bearing medium at a first speed; and, said control means controls said moving means by using said tracking error signal; and a second mode in which said second process means simultaneously outputs said additional information recorded in all of said plurality of areas, said moving means moves said tape-shaped record bearing medium at a second speed being different from said first speed, and said control means controls said moving means without using said tracking error signal.

11. An apparatus according to claim 10, wherein pilot signals of four different frequencies are recorded, one in each of many recording tracks in rotation, within each of said plurality of areas; and said generating means is arranged to generate said tracking error signal by using said pilot signals reproduced by said rotary head.

12. An apparatus according to claim 11, wherein $n = i \times 4 + 1$ ("i": an integer).

13. An apparatus for reproducing main information and additional information from a tape-shaped record bearing medium which has a plurality of areas extending longitudinally and being in parallel with each other, each area having many helical slant tracks on each of which main and additional information are recorded, said main information in one of said many helical tracks being larger in quantity than said additional information, comprising:

(a) a rotary head arranged to transversely trace the plurality of areas provided on said tape-shaped record bearing medium;
(b) are designating means for designating one of said plurality of areas;
(c) gate means arranged to gate a signal reproduced by said rotary head in response to said area designating means for outputting informations recorded on said one of said plurality of areas;
(d) first process means for processing said main information gated by said gate means, said first process means being arranged to output said main information recorded on the area designated by said designating means; and
(e) second process means for processing said additional information reproduced by said rotary head, said second process means being able to simultaneously output said additional information recorded on at least two of said plurality of areas.

* * * * *